US009642334B2

(12) United States Patent
Dole et al.

(10) Patent No.: US 9,642,334 B2
(45) Date of Patent: May 9, 2017

(54) MOBILE SYSTEM FOR CLEANING TEATS OF A MILK-PRODUCING ANIMAL

(71) Applicant: ALPHA TECHNOLOGY U.S.A. CORPORATION, Longwood, FL (US)

(72) Inventors: Kevin Dole, Longwood, FL (US); John Seehafer, Marshfield, WI (US); Larry Bilskie, Winter Springs, FL (US)

(73) Assignee: ALPHA TECHNOLOGY U.S.A. CORPORATION, Longwood, FL (US)

( * ) Notice: Subject to any disclaimer, the term of this patent is extended or adjusted under 35 U.S.C. 154(b) by 855 days.

(21) Appl. No.: 14/013,358

(22) Filed: Aug. 29, 2013

(65) Prior Publication Data

US 2014/0060449 A1    Mar. 6, 2014

Related U.S. Application Data

(60) Provisional application No. 61/695,596, filed on Aug. 31, 2012, provisional application No. 61/708,135, (Continued)

(51) Int. Cl.
    *A01J 7/04*    (2006.01)
(52) U.S. Cl.
    CPC ...................... *A01J 7/04* (2013.01)
(58) Field of Classification Search
    CPC ............ A01J 7/04; A01J 7/025; A01K 13/001
    (Continued)

(56) References Cited

U.S. PATENT DOCUMENTS 2,228,698 A * 1/1941 Fitches ................ A01J 7/04
                                                119/670
2,283,812 A * 5/1942 Kohinka ............ A01K 13/004
                                                119/602
(Continued)

FOREIGN PATENT DOCUMENTS

DE          849777       9/1952
DE         1677490       6/1954
(Continued)

OTHER PUBLICATIONS

Puli Sistem, The Precursor of all Teat Scrubbers, 1990 pp. 1-2; https://twitter.com/pulisistem.
(Continued)

*Primary Examiner* — Yvonne Abbott-Lewis
(74) *Attorney, Agent, or Firm* — Robert L. Wolter; Beusse, Wolter, Sanks & Maire PLLC

(57) ABSTRACT

An embodiment of the invention is directed to a mobile system for cleaning teats of milk-producing animals, wherein the animals are temporarily housed in a building and the teats are cleaned or disinfected before a milking operation is started. The system includes a mobile cart configured for movement along a floor of the building and a container on the cart containing a disinfectant solution. A remotely operable hand-held applicator is provided in fluid communication with the container for cleaning teats of a milk producing animal. The system further includes a pump, a control circuit, and a motor, for operating the system to disinfect and clean the teats of the milk-producing animal. In an embodiment, the container, power source, control circuit and pump are disposed on the cart with the hand-held applicator operatively connected to the control circuit, motor and container.

15 Claims, 5 Drawing Sheets

Related U.S. Application Data filed on Oct. 1, 2012, provisional application No. 61/783,785, filed on Mar. 14, 2013.

(58) Field of Classification Search
USPC ............... 119/651, 652, 670, 664, 14.08, 47
See application file for complete search history.

(56) References Cited

U.S. PATENT DOCUMENTS

| | | | |
|---|---|---|---|
| 2,361,970 A | 11/1944 | Schmitt | |
| 3,138,815 A * | 6/1964 | James, Jr. | A47L 1/02 15/103 |
| 3,285,297 A * | 11/1966 | Duft | A01J 5/04 119/14.11 |
| 3,630,369 A * | 12/1971 | Nichols | A47L 13/58 15/264 |
| 3,648,696 A * | 3/1972 | Keith | A61D 1/02 119/14.01 |
| 3,713,423 A * | 1/1973 | Sparr, Sr. | A01J 7/04 119/670 |
| 2,678,627 A | 7/1977 | Bender et al. | |
| 4,034,711 A | 7/1977 | Bender et al. | |
| 4,305,346 A * | 12/1981 | Sparr, Sr. | A61D 11/00 119/670 |
| 4,403,569 A | 9/1983 | Bennett | |
| 5,211,132 A * | 5/1993 | Farina | A01J 7/04 119/664 |
| 5,235,937 A * | 8/1993 | Farina | A01J 7/04 119/14.01 |
| 5,383,423 A | 1/1995 | van der Lely | |
| 5,641,498 A | 6/1997 | Loosemore | |
| 6,123,966 A | 9/2000 | Kross | |
| 6,155,204 A * | 12/2000 | van der Lely | A01J 7/04 119/14.02 |
| 6,321,688 B1 * | 11/2001 | Eriksson | A01J 7/04 119/651 |
| 6,325,021 B1 * | 12/2001 | Farina | A01J 7/04 119/612 |
| 6,343,566 B1 * | 2/2002 | Eriksson | A01J 7/04 119/14.01 |
| 6,379,685 B1 | 4/2002 | Richter et al. | |
| 6,394,038 B1 * | 5/2002 | Eriksson | A01J 7/04 119/600 |
| 6,523,209 B1 * | 2/2003 | Dickerson | A47L 11/38 15/29 |
| 6,524,624 B1 | 2/2003 | Morelli et al. | |
| 6,550,420 B1 * | 4/2003 | Bjork | A01J 7/04 119/14.47 |
| 6,591,784 B1 * | 7/2003 | Eriksson | A01J 7/04 119/14.08 |
| 6,752,102 B2 * | 6/2004 | Dahl | A01J 7/04 119/14.47 |
| 6,935,271 B2 | 8/2005 | Edison et al. | |
| 7,165,510 B2 * | 1/2007 | Hakes | A61D 1/02 119/652 |
| 7,178,480 B2 * | 2/2007 | Dahl | A01J 7/04 119/14.47 |
| RE41,279 E | 4/2010 | McSherry et al. | |
| 7,882,802 B2 * | 2/2011 | Van Den Berg | A01J 7/04 119/14.02 |
| 2005/0115506 A1 * | 6/2005 | Van Den Berg | A01J 5/017 119/14.03 |
| 2007/0175405 A1 | 8/2007 | Vecchia | |
| 2008/0149034 A1 * | 6/2008 | Van Den Berg | A01J 5/003 119/14.08 |
| 2009/0084324 A1 * | 4/2009 | Hiley | A01J 7/04 119/652 |

FOREIGN PATENT DOCUMENTS

| | | | |
|---|---|---|---|
| EP | 399132 | 11/1990 | |
| EP | 1030549 | 7/2003 | |
| FR | 2559351 A1 * | 8/1985 | ............... A01J 7/04 |
| FR | 2559351 | 8/1995 | |
| WO | 9904623 | 2/1999 | |
| WO | 9905904 | 2/1999 | |
| WO | 0047041 | 8/2000 | |
| WO | 2004034775 | 4/2004 | |

OTHER PUBLICATIONS

Puli-Sistem S.R.L., Puli F50 teatscrubbing system for cleaning teats of cows, 2004, pp. 1-2, http://www.puli-sistem.com/.

Neijenhuis, F. et al., "Relationship Between Teat-End Callosity and Occurence of Clinical Mastitis," J. Dairy Sci., 2001 pp. 2664-2672, vol. 84, No. 12, Am. Dairy Sci. Assoc.

Dube, B et al., "Genetic Analysis of Somatic Cell Score and Udder Type Traits in South African Holstein Cows," Sth. Afric. Journ. Of Anim. Sci., 2008, pp. 1-11, vol. 38, No. 1.

Oliver et al., "Prevention of Bovine Mastitis by a PreMilking Teat Disinfectant Containing HClO2 & ClO2," Journ. of Dairy Sci., Am. Dairy Science, vol. 76, No. 1, Jun. 1, 1993, 287-292.

Coates, D., "An Evaluation of the Use of Chlorine Dioxide (Tristel One-Shot) in an Automated Washer/Disinfector," Journal of Hospital Infection, vol. 48, No. 1, May 1, 2001.

Dairy Vet, "Managing My Herd," Herd Management, pp. 4, Mar. 2007.

Ahn, "Product News," pp. 14, Sep./Oct. 2004.

Farmers Guardian, "Tacking High Cell Counts Head on in the Parlour," Dairy Health, pp. 74-75, Feb. 2, 2007.

Tractor & Machinery Showcase, "Dairy Supplies," pp. 47, Nov. 2006.

Oliver et al., "Prevention of Bovine Mastitis by a PostMilking Teat Disinfectant Containing Chlorous Acid and Chlorine Dioxide in a Soluble Polymer," Journ. of Dairy Sci., vol. 72, No. 1, 1989, 3091-3097.

Dreschsler, P.A., et al., "Evaluation of a Chlorous Acid-Chlorine Dioxide Teat Dip Under Experimental and Natural Exposure Conditions," Journ of Dairy Sci, vol. 73 1990, 2121-2128.

Boddie, R.L., et al., "Efficacy of Two Barrier Teat Dips Containing Chlorous Acid Germicides Against Exeperimental Challenge with *Staphylococcus aureus* an *Streptococcus agalactiael*," Journ of Dairy Sci, vol. 77, 3192-3197.

Boddie, R. L., et al., "Germicidal Activity of a Chlorous Acid-Chlorine Dioxide Teat Dip and a Sodium Chlorite Teat Dip During Experimental Challenge with *Staphylococcus aureus* and *Streptococcus agalactiae*," Journ of Dairy Sci, vol. 81, 1998, 2293-2298.

Boddie, R.L., et al., "Efficacies of Chlorine Dioxide and Lodophor Teat Dips During Experimental Challenge with *Staphylococcus aureus* and *Streptococcus agalactiae*," Journ of Dairy Sci, vol. 83, 2000, 2975-2979.

Nickerson, S.C., "Choosing the Best Teat Dip for Mastitis Control and Milk Quality, NMC-PDPW Milk Quality Conference Proceedings," Apr. 2001, p. 43.

Lin, Maw-Yeong, et al. "Germicidal Activity and Chicken Toxicity of Chlorine Dioxide," Taiwan Vet J 34, 2008, 142-148.

Tims, Leo L. "Evaluation of a Novel Chlorine Dioxide Teat Dip on Teat End and Teat Skin Health," Animal Industry Report, 2008, 159-164.

Zaninelli, M., et al., "Evaluation of Teat Cleaning Bymechanical Device Correlated with Intramammary Infection, Somatic Cell and Total Bacteria Count," NMC Annual Meeting Proceedings, 2005, p. 303.

Rao, Madduri V., et al. "Acidified Sodium Chlorite (ASC) Chemical and Technical Assessment," 2007 pp. 1-12.

\* cited by examiner

MOBILE SYSTEM FOR CLEANING TEATS OF A MILK-PRODUCING ANIMAL

CROSS-REFERENCE TO RELATED APPLICATIONS

This application claims the benefit of U.S. Provisional Application No. 61/695,596 filed Aug. 31, 2012, U.S. Provisional 61/708,135 filed Oct. 1, 2012, and U.S. Provisional 61/783,785 filed Mar. 14, 2013, and incorporated herein by reference in their entirety.

BACKGROUND OF THE INVENTION

Embodiments of the present invention relate to systems and methods that are used for cleaning teats of milk producing animals. More specifically, the invention pertains to those systems and methods that utilize hand-held applicators to apply a disinfectant solution to teats for cleaning the teats of a milk-producing animal.

A variety of different methods and systems are presently available for cleaning teats from animals that produce milk. Several methods incorporate or utilize manual labor for cleaning the teats including the immersion of the teat in a dipping cup that includes a cleaning or disinfectant solution for a period of not less than one minute. Typically such cleaning solutions are iodine-based solutions or may include 5,000 ppm of chlorine dioxide, and have a thick syrup-like consistency and/or contain conditioning additives. A worker inserts the teat in the dipping cup to immerse the teat in the disinfectant. This is done sequentially for all teats on the animal. Because the solutions are thicker or contain one or more conditioning compounds, the solutions leave a residue (sometimes a tacky residue) that must be removed from the teat before milking. Accordingly, a worker uses a towel to dry each teat in preparation for milking. Such methods that incorporate these manual steps may be impractical for larger dairies, which may include thousands of cows. In addition, such methods may be slower than systems that may include remotely operable solution applicators.

Systems are available that utilize rotating brushes in combination with a cleaning solution to clean teats. One such system is disclosed in U.S. Pat. No. 8,402,920 (referred to herein as the '920 patent), the entirety of which is incorporated herein by reference and which is sold and distributed by Alpha Technology U.S.A Corporation. The teat cleaning system disclosed in the '920 includes a controller or a programmable logic controller that controls delivery of disinfectant solution to a remotely operable hand-held applicator.

Currently available systems such as the aforementioned systems by Alpha Technology U.S.A. Corporation described above, and is the subject of the'920 patent, are geared toward larger scale dairy operations in which cleaning and milking operations are conducted in an oversized parlor. These systems may include a wall mounted control box and relatively large disinfectant solution containers fixed at a location in the parlor, while the hand-held applicator is remotely operable. However, these systems may be less practical for smaller dairy parlors. A need has therefore been identified herein for a mobile system for cleaning teats of a milk-producing animal that is configured for use for smaller dairy farms that for example may have 500 or fewer cows and do not have the larger oversized milking parlors.

BRIEF DESCRIPTION OF THE DRAWINGS

The invention is explained in the following description in view of the drawings that show.

DETAILED DESCRIPTION OF THE INVENTION

A more particular description of the invention will be rendered by reference to specific embodiments thereof that are illustrated in the appended drawings. Understanding that these drawings depict only typical embodiments of the invention and are not therefore to be considered to be limiting of its scope, the invention will be described and explained.

Figure 1:
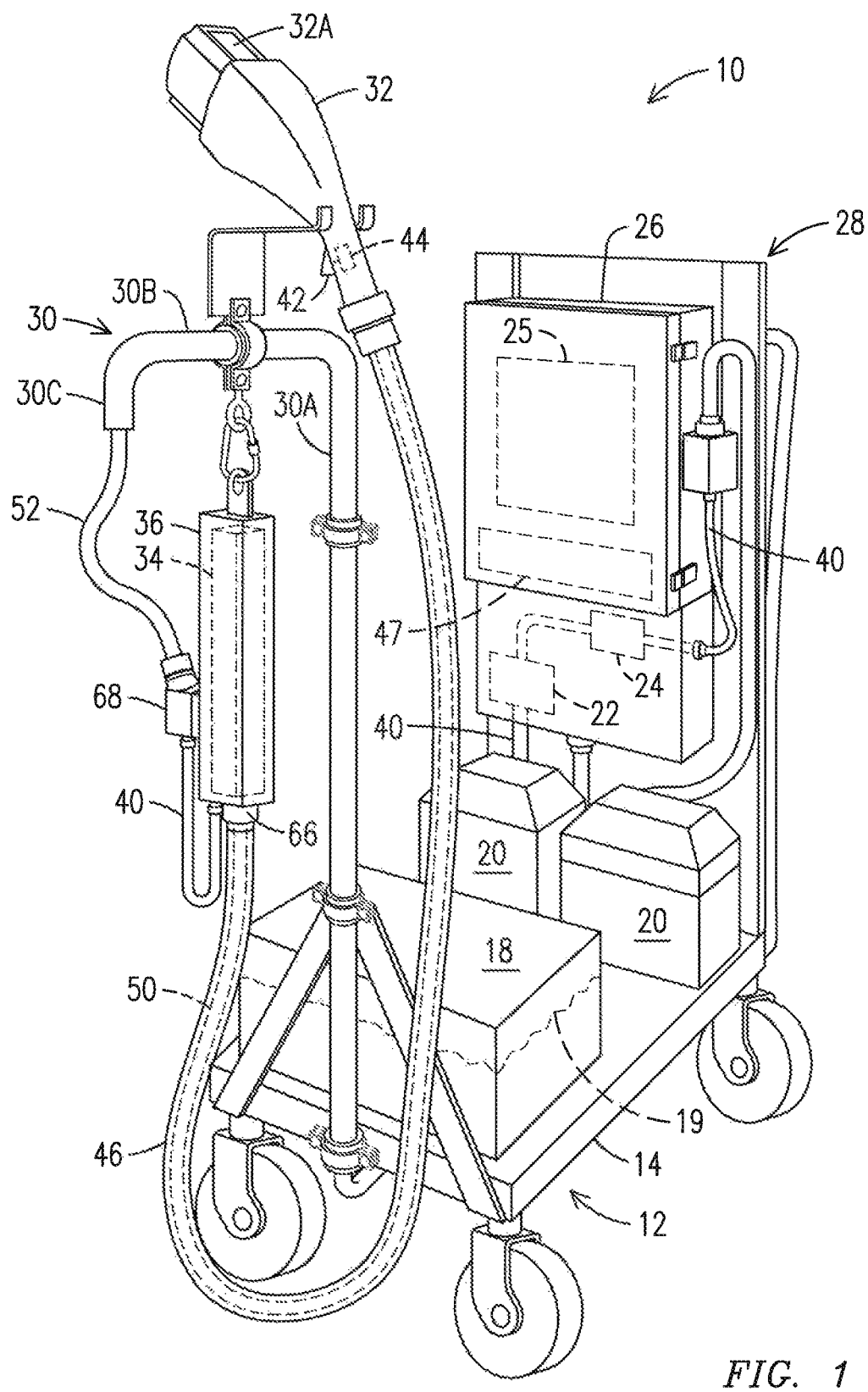
FIG. 1 provides a perspective view of an embodiment in accordance with the subject invention.

With respect to FIG. 1, an embodiment of the mobile system 10 for cleaning teats of a milk-producing animal is illustrated. As shown, the mobile system 10 includes a cart 12 that is configured for movement along a floor of a building such as a milking parlor. More specifically, the cart 12 includes a generally horizontally disposed platform 14, a first support member 28 and a second support member 30 all of which support one or more components of the system.

Generally, the components of the mobile system 10 may include a controller or control circuit 25, a power source 20, a pump 22, a container 18 in which disinfectant solution 19 is stored, a hand-held applicator 32 and a motor 34. These components are operatively associated to deliver the disinfectant solution 19 to a volume 32A in the hand-held applicator 32 in which a teat of an animal has been inserted for cleaning the teat for milking. Scrubbing elements (not shown) in the volume 32A of the hand-held applicator 32 are actuated by the motor 34 via an elongated flexible drive shaft 50 as disinfectant solution 19 is delivered to the hand-held applicator 32. In addition, control circuitry is provided such that after a first time duration, during which time disinfectant solution 19 is supplied to the hand-held application 32, and while the scrubbing elements are being actuated to clean a teat or teats, the scrubbing elements are actuated for a second time duration for a dry cycle. The term "control circuit" as used herein includes a PLC and/or a circuit with electronic components that controls the activation and deactivation of the system components as described below in more detail.

Figure 2:
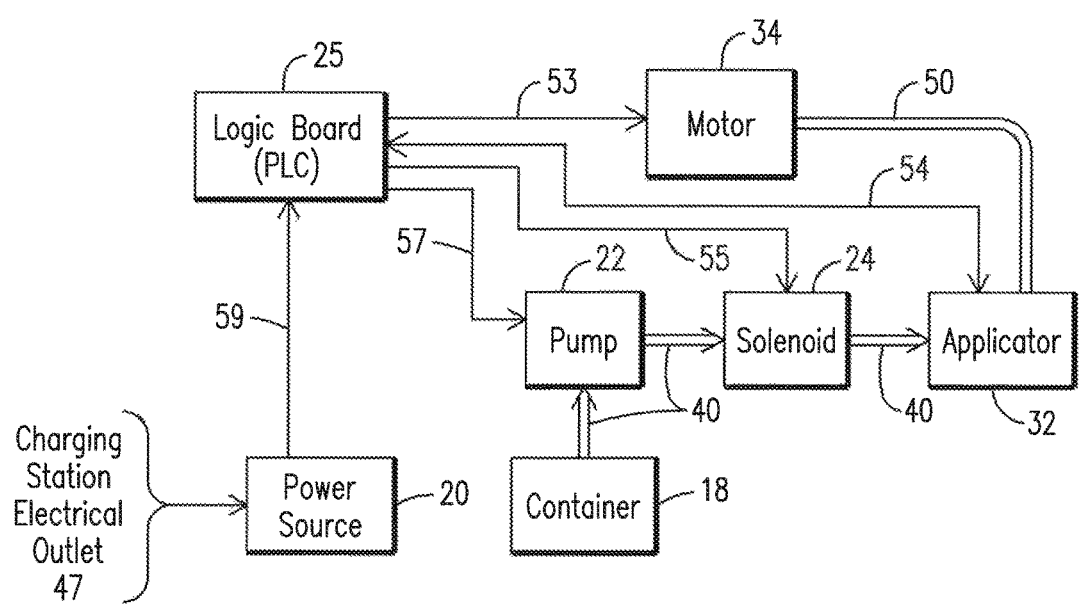
FIG. 2 provides a schematic diagram of the mobile system.

As shown schematically in FIG. 2, the container 18 is in fluid communication with the hand-held applicator 32 via pump 22, solenoid valve 24 and conduit 40. The controller or control circuit 25 may be in electrical communication with the power source 20 (via electrical line 59), pump 22 (via electrical line 57), solenoid valve 24 (via electrical line 55), motor 34 (via electrical line 53) and the hand-held applicator 32 (via electrical line 54). The controller 25 may be a programmable logic controller (PLC) and configured to function in a manner as described in detail in the '920 patent, the content of which is and has been incorporated herein in its entirety. Alternatively, the controller 25 may be a control circuit that may include electronic components such as relays (solid state and/or mechanical), current transformers, transducers, etc., to control timing of delivery of solution and activation/deactivation of the motor 34 and motor pump 22 and/or the opening and closing of valve 24 and motor overload protection.

Again in reference to FIG. 1, the hand-held applicator 32 includes an actuating mechanism such as a trigger 42 to close an electrical switch 44. When the switch 44 is closed, the controller 25 transmits one or more control signals to activate the motor 34, the pump 22 and the solenoid valve 24. To that end, the motor 34 actuates the flexible drive shaft 50 which in turn drives a gear assembly in the hand-held applicator 32 which causes the scrubbing elements to rotate or otherwise actuate. Simultaneously therewith, the valve 24 is opened and the pump 22 is activated to deliver disinfectant solution 19 from the container 18 to the volume 32A of the hand-held applicator 32 via the fluid conduit 40. The disinfectant solution 19 is supplied to the volume 32A of the hand-held applicator for a first tune duration during a cleaning cycle.

In an embodiment, when the trigger 42 is released the controller 25 is configured such that the motor 34 continues to drive the flexible draft shaft 50 and the scrubbing elements are actuated for a second time duration to dry the teats during a dry cycle. While the embodiments described herein refer to a trigger 42 that is released to discontinue the supply of disinfectant solution 19 to the hand-held applicator 32, the controller 25, trigger 42 and switch 44 may be configured such that the trigger 42 may be depressed and released to initiate the supply of disinfectant solution 19 to the hand-held applicator 32, and then after the first time duration the supply of disinfectant solution 19 is stopped and the scrubbing elements continue to move or rotate for the second time duration to dry the teats.

The disinfectant solution 19 is preferably an aqueous solution that has a viscosity or vapor pressure that is substantially equal to that of water and does not include conditioners, foaming agents and the like. In an embodiment, the disinfectant solution 19 contains chorine or a chlorine species and/or is an acidified sodium chlorite solution. An acidified sodium chlorite solution may contain about 100 ppm to about 200 ppm of chlorine dioxide, and preferably about 150 ppm of chlorine dioxide. Such a solution may be made by combining sodium chlorite with citric acid as described in the '920 patent.

In the embodiment shown in FIG. 1, the power source 20 and container 18 are positioned on the platform 14. Alternatively, the power source 20 and/or the container 18 are provided off-board. In such an embodiment, electrical cables and a fluid conduit are of sufficient length so the cart 12 may be moved to desired locations within a building for cleaning operations.

The mobile system 10 may range in size, wherein the amount of power supply for each system will be based on the size of the system and the number of animals to be serviced by each system. The power source 20 may include batteries that are deep cycle marine grade trolling motor batteries, either gel or wet cell. In a non-limiting example, the power source may include two 12 volt batteries. Other batteries that may be used to power the system 10 include the Odyssey® PC310 or PC535 batteries having a cyclic charge voltage of 14.4V-14.8V and a float charge voltage of 13.5V-13.8V.

The size of container 18 may also change depending on the size of the system 10, in one particular example, the container 18 may be a 6½ gallon container in a smaller mobile system, or a 13 gallon container in a larger mobile system. The container 18 may also be embodied as multiple individual containers 18 each housing an amount of disinfectant solution for use. Each mobile system 10 will preferably have sufficient power and disinfectant solution to last throughout an entire cleaning operation.

The mobile system 10 may also include a battery charging station 47 which can be embodied in one example as an onboard battery charger as shown in FIG. 8, described in more detail below. The onboard battery charger may be embodied as a 6 amp dual bank charger and a fully waterproof marine grade charger. The battery charging station 47 may alternatively be positioned off-board. An example of a battery for use with two 12 volt batteries is a 6 amp dual battery charger sold by Marineco under the name GUEST®.

As shown in FIG. 1, the first and second support members 28, 30 are affixed to the platform 14, the controller 25, housed in a control box 26, is mounted to the first support member 28, and the motor 34 (in housing 36) is suspended from the second support member 30 above the platform 14. In the embodiment shown and described herein, the first and second support members 28, 30 are mounted to the cart 12 at respective opposite ends of the platform 14. However, it is possible that both the motor 34 and the controller 25 could be supported on a single support member; or only one of the controller 25 or motor 34 is supported on a support member.

Figure 3:
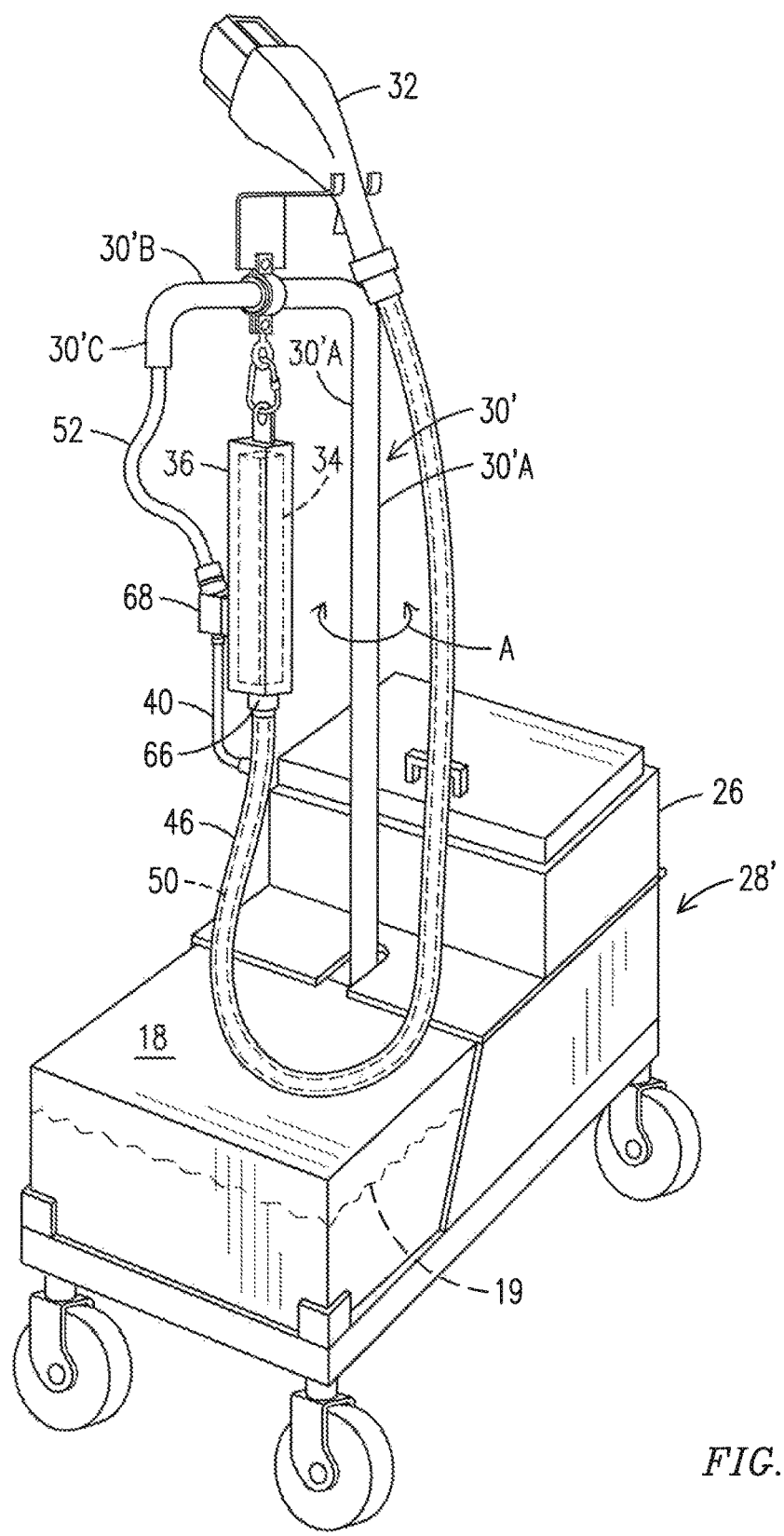
FIG. 3 is a perspective view of a second embodiment of a mobile system in accordance with the subject invention.

In the embodiment shown in FIGS. 1 and 3, the second support member 30, has a generally cylindrical or pipe-like configuration and through which a flexible jacket 52, housing the conduit 40 and electrical lines 54, is routed. Accordingly, the support member 50 may include a vertical section 30A having a bottom end affixed to the cart platform 14 and a horizontal section 30B disposed at the top end of the vertical section 50A. In addition, a downwardly curving end 30C is provided to position the flexible jacket 52 relative to the motor 34, which is attached to or suspended from the horizontal section 50B, so that electrical lines 54 may be connected to the motor 34. While the embodiment described herein includes the above described pipe-like or cylindrical support member, other structural configurations, such as flat or angled support members may be used to secure the flexible jacket 54 with conduits and electrical lines and position the same unobtrusively relative to system components and movement of the cart 12.

Figure 4:
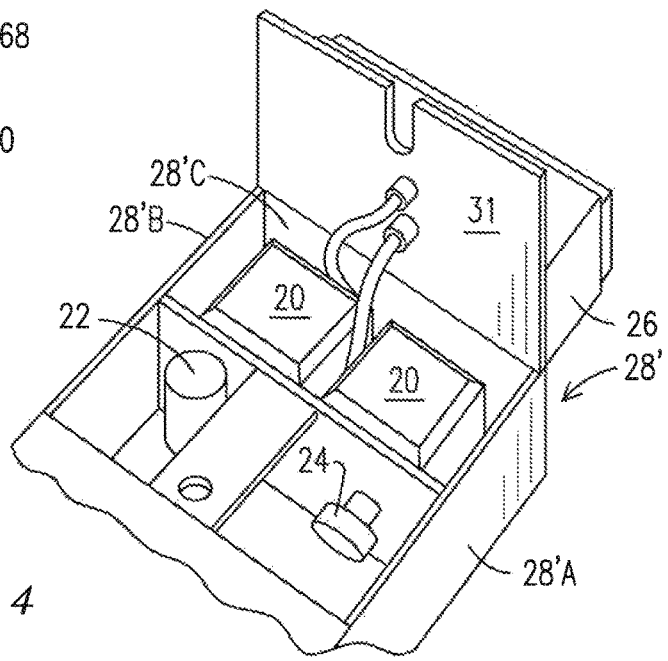
FIG. 4 is a perspective view of the housing for the second embodiment opened and showing a power source and a pump in accordance with the subject invention.

In the embodiment shown in FIGS. 3 and 4, the second support member 30' is positioned towards a center of the platform 14 and is pivotal about its longitudinal axis as represented by arrow A. To that end, the second support member 30 in FIG. 1 may also be pivotally mounted to the end of the platform 14. Again with respect to FIG. 3 and in FIG. 5, the first support member 28 takes the form of a housing on which the control box 26 is pivotally mounted to access an interior of the support member/housing 30. More specifically, a cover 31 on the housing 28' is pivotally attached to panels 28A, 28'B and 28C, and the control box 26 is mounted to the cover 31. As further shown in FIG. 4, the power source 20, pump 22 and solenoid valve 24 are mounted in the support member/housing 28.

As indicated with reference to FIG. 2, the applicator 32 is connected in fluid communication with pump 22 and solenoid valve 24 by a flexible conduit/line 40 and in electrical communication to the controller 25 by electrical lines 54 which also electrically link the motor 34 and the controller 25. In addition, electrical line(s) provide electrical communication between the control circuit 25 and the motor 34.

The electrical lines 54 and conduit 40 are preferably housed within the flexible and insulated jacket 52 (FIGS. 1, 3 and 4). The flexible jacket 52 extends underneath the platform 14 of the cart 12 and upward along the second support member 30, 30' in one embodiment. The second support member 30, 30' provides structural support for the flexible conduit 40 and the electrical lines 54 within the flexible jacket 52. Accordingly, the second support member 30, 30' keeps the flexible jacket 52, out of the pathway of the cart 12 and avoids interference between flexible jacket 52 and other components of the system 10 or items within the milking parlor.

Figure 5:
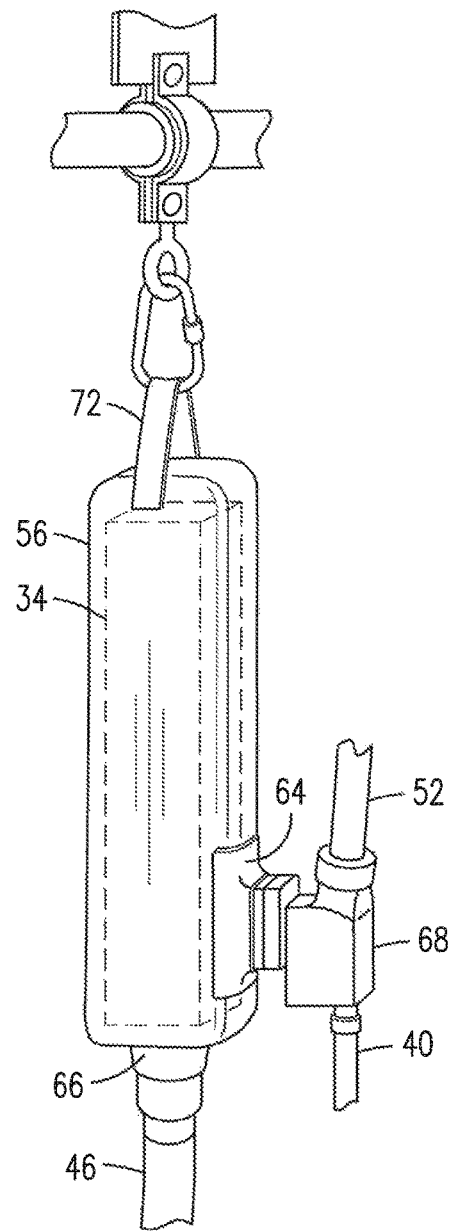
FIG. 5 is a perspective of the motor in a water resistant casing.
Figure 6:
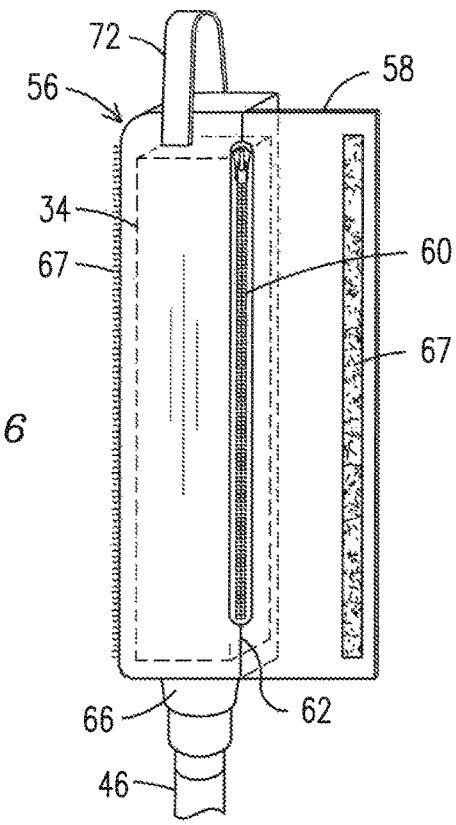
FIG. 6 is a perspective view of the motor casing partially opened.

With respect to FIGS. 5 and 6, the motor 34 may be encased within a cover 56 that is preferably fabricated of a water-resistant material such as vinyl. The cover 56 may include a flap 58 that overlaps a portion of the cover 56. The cover 56 also includes a releasable attachment mechanism 67 along the flap 58 and cover 56 such as Velcro®. In addition, a zip fastener 60 is disposed along an edge 62 of the cover 56 and the flap 56 to further secure and seal the motor 34 in the cover 56. Also illustrated are two sleeves 64 and 66 that are preferably fabricated of a resilient water-resistant material, such as neoprene, which fits snugly against the motor fixture, component couplings or system parts to further seal and protect the motor. Sleeve 64 receives a power inlet fixture 68 of the motor 34 and sleeve 66 receives an output end of the motor 34 or against jacket 54 which contains the flexible drive shaft 50 and conduit 40. In addition, a strap 72 is provided to suspend the motor 34 in the cover 56 from the second support member 30, 30'.

Figure 7:
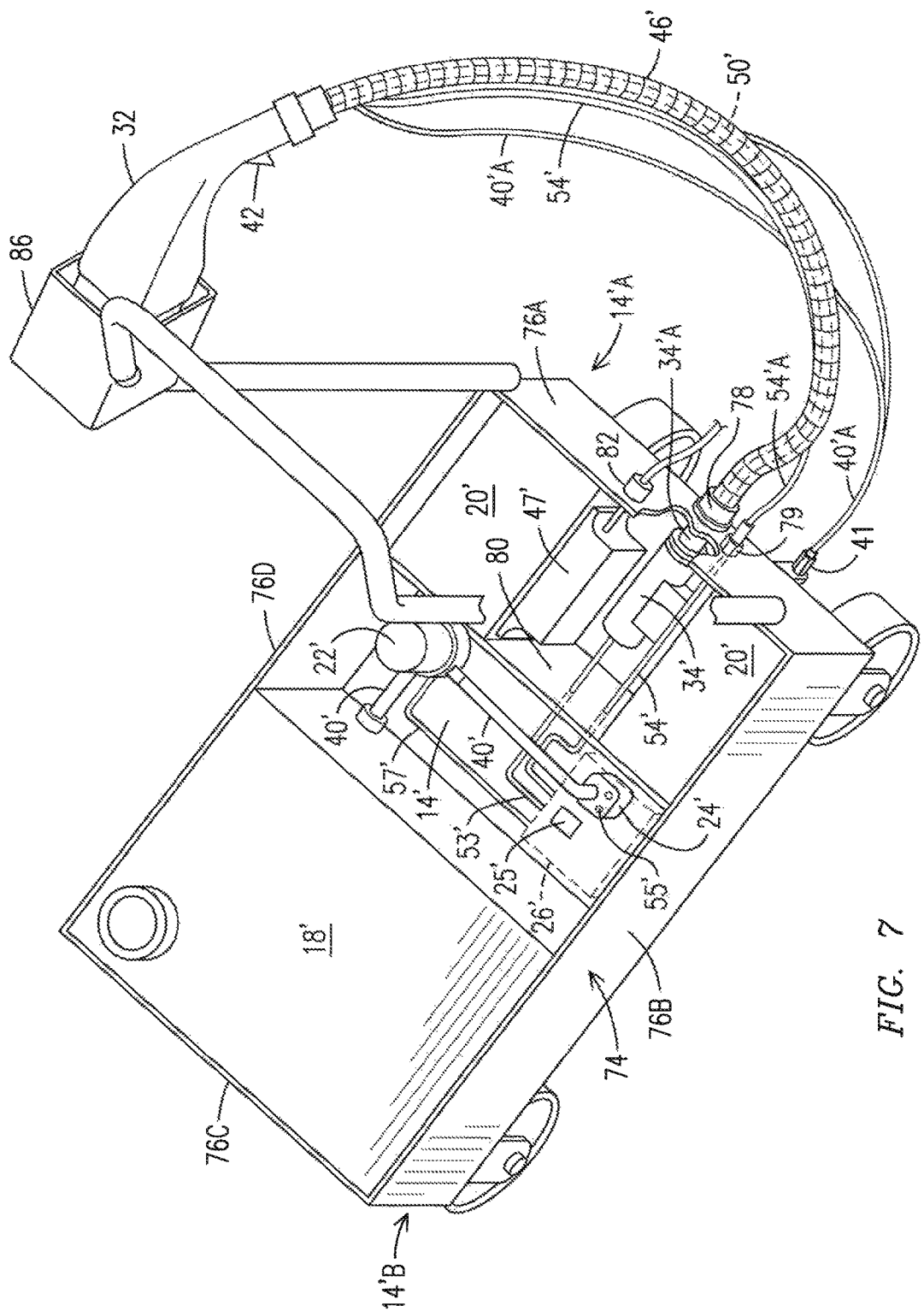
FIG. 7 is a top perspective view of a third embodiment of the mobile system in accordance with the subject invention.

In the non-limiting embodiment shown in FIG. 7, the container 18', power source 20', pump 22', solenoid valve 22', motor 34' and control box 26', with the control circuit/controller 25' are positioned on, or adjacent to, the platform 14'. In a preferred embodiment a plurality of panels 76A-76D are mounted to the platform 14' and operatively connected to form a housing 74 in which the aforementioned components are contained. In addition, the battery charger 47' may also be positioned in the housing 74 adjacent the power source 20'. As shown, the power source 20' is disposed at a first end 14'A of the platform 14' and the container 18' is disposed toward the opposite second end 14'B. The control box 26', with control circuit 25', is mounted in the housing 74 adjacent to the solenoid valve 22'.

In addition, the control box 26', pump 22' and valve 24' are disposed between the container 18' and power source 20'. A partition 80 is provided to separate the delivery components 26', 22' and 24' from the power source 20' and motor 34' to minimize the risk of wetting these electrical components. To that end, the conduit 40' is piped from the solenoid valve 24' underneath the platform 14' to the first end and coupled at fixture 41 to panel 76A and a conduit 40'A that extends to the hand-held applicator 32'. In addition, the flexible drive shaft 50' is connected to a motor shaft 34'A of the motor 34', and electrical lines 54' and 54'A are connected at the panel 76A using quick connect/disconnect couplings 78, 79. With respect to the coupling between the drive shaft 50' and motor 34', coupling seals may be used to seal the motor 34' from disinfectant solution that may drain form the hand-held applicator 32' into the casing 46'. Also shown in FIG. 7, is an electrical coupling 82 connecting the charger 4T to a plug (not shown), which can be connected to an electrical outlet as needed. Alternatively, the charge 47' may also be located off board and connectable to the batteries 20' as necessary for charging.

Electrical line 57' provides electrical communication between the control circuit 25' and the pump 22'. In addition, the control box 26' is mounted in the housing 74 and disposed above the solenoid valve 24' and electrical leads 55' provide electrical communication between the valve 24' and control circuit 25'.

As further shown in FIG. 7, the conduit 40'A and electrical lines 54'A are not encased within flexible casing 46' as in the previously described embodiments. More specifically, the conduit 40'A and electrical lines 54'A are inserted into the flexible casing 46' adjacent to the base of the hand-held applicator 32. In addition, the cart 12' may have a receptacle or holder 86 for storing the hand-applicator 32' as shown in FIG. 7.

The operation and function of the embodiment shown in FIG. 8 is similar as that described in reference to the embodiments shown in FIGS. 1-4. A control circuit 25', used in place of a PLC, may include one or more relays, time delay relays and/or solid state relays to control the timing of the activation and deactivation of the pump 22 (22'), solenoid valve 24 (24') and/or motor 34 (34') for any of the above described embodiments. In addition, the control circuit 25, 25 may include a current transducer to monitor the level of current supplied to the motor. More specifically, a transducer may be used to detect if the current supplied to the motor 34, 34' exceeds a predetermined threshold, and if that threshold is met, the current to the motor 34, 34' is terminated to shut the motor 34, 34' off. By way of example, the rise in current supplied to the motor 34, 34' may indicate that the gear assembly and/or scrubbing elements are not functioning properly such as when the tail of a cow is caught in the hand-held applicator 32, 32'.

In a further embodiment of the invention, the mobile system 10 may include a self-propelling mechanism for providing ease in movement of the mobile system 10 during use. The self-propelling mechanism may require its own motor on the cart 12, and the self-propelling mechanism may be powered by the power source 20. Additional power sources may be used to provide power to the system. The mechanism by which power is provided from the motor to the self-propelling source provides power evenly to wheels at both sides of the cart 12. That is, to provide the same torque and speed simultaneously to each of the powered wheels under the controller or wheels under the first or second support members. The self-propelling mechanism can be powered on or off by a feature such as a button or a switch which can be located on any part of the mobile system 10, but preferably on one of the first or second support members 48, 50.

Furthermore, the mobile system 10 may include an engine provided to assist in movement of the system 10. The system 10 may further include a seat or portion of the mobile system 10 provided such that the user of the mobile system 10 can be seated, and the engine can provide movement of the mobile system 10 during the procedure of cleaning and disinfecting the teats of the cows.

In an embodiment, a seat configured, for example, to provide support to one using the mobile system 10 embodiments described herein may be provided on the cart 12. The seat may be attached to the cart 12, and is preferably pivotally mounted to the cart such that when not in use, it can be placed in a storage position on the cart 12. The seat may take the form of a stool with collapsing legs which are released when the seat is unfolded away from the cart 12 and positioned adjacent to the cart 12 for use, and collapsed when the seat is folded toward the cart 12 and positioned on the cart 12 for storage. In an embodiment, the seat may be mounted on any portion of the cart 12, including, but not limited to, the platform 14, either of the first or the second support member 28, 30, or both.

In the embodiments described herein, the various components of the system including the cart 12, the support members 28, 30, and other components of the system 10 may be fabricated from any material of sufficient strength to support the components of the system 10, and light enough so that the cart 12 can be moved across a floor by one user. Such materials may include, but are not limited to, stainless steel, plastic, fiberglass and other materials known in the art.

While certain embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A mobile system for cleaning a teat of a milk-producing animal prior to a milking operation, comprising:
   a cart configured for movement across a floor of a building in which animals are housed, the cart comprising a generally horizontally disposed platform;
   a control circuit;
   a container in which a disinfectant solution is stored;
   a hand-held applicator having a volume for receiving a teat and comprising one or more scrubbing elements and the volume is in fluid communication with the container;
   a motor operatively connected to the scrubbing elements;
   a pump and a conduit in fluid communication with the hand-held applicator and the container;
   a power source in electrical communication with the control circuit; and
   a housing on a first end of the platform and in which the power source and motor are contained;
   wherein the control circuit is in electrical communication with the motor to deliver disinfectant solution to the hand-held applicator to clean a teat when it is inserted into the volume of the hand-held applicator as the scrubbing elements are actuated; and
   wherein the container is on the platform toward a second opposite end of the platform, the control circuit is in a control box, and the control box and pump are disposed between the container and power source.

2. The mobile system of claim 1, further comprising a solenoid valve disposed between the container and power source.

3. The mobile system of claim 1, further comprising a panel affixed to a first end of the platform and a plurality of couplings attached to the panel, wherein the system further comprising:
   a first fluid line extending from the container to the panel and coupled to a second fluid line from the panel to the hand-held applicator;
   a first set of electrical lines connecting from the control circuit to the panel and coupled at the panel to a second set of electrical lines that extend to the hand-held applicator; and,
   an electrical switch on the hand-held applicator and connected to at least one electrical line of the second set of electrical lines.

4. The mobile system of claim 1, further comprising an elongated flexible shaft coupled to the motor at a first end thereof at a panel on the cart and coupled at a second end thereof to a gear drive at the hand-held applicator.

5. The mobile system of claim 1, further comprising a plurality of panels connected to the platform and to one another forming a housing in which the container, controller, pump, motor and power source are housed.

6. A mobile system for cleaning a teat of a milk-producing animal prior to a milking operation, comprising:
   a cart configured for movement across a floor of a building in which animals are housed, the cart comprising a generally horizontally disposed platform;
   a control circuit;
   a container in which a disinfectant solution is stored;
   a hand-held applicator having a volume for receiving a teat and comprising one or more scrubbing elements and the volume is in fluid communication with the container;
   a motor operatively connected to the scrubbing elements;
   a pump and a conduit in fluid communication with the hand-held applicator and the container; and
   a power source in electrical communication with the control circuit;
   wherein the control circuit is in electrical communication with the motor to deliver disinfectant solution to the hand-held applicator to clean a teat when it is inserted into the volume of the hand-held applicator as the scrubbing elements are actuated, wherein the control circuit is configured to transmit one or more signals to activate the pump and the motor so that the disinfectant solution is delivered to the hand held applicator for a first time duration as the scrubbing elements are actuated during a cleaning cycle; and,
   the control circuit is further configured such that after the first time duration the pump is deactivated and the motor remains activated so that the scrubbing elements are actuated for a second time duration without delivery of disinfectant solution to the hand-held applicator during a drying cycle.

7. A mobile system for cleaning a teat of a milk-producing animal prior to a milking operation, comprising:
   a cart configured for movement across a floor of a building in which animals are housed, the cart comprising a generally horizontally disposed platform;
   a control circuit;
   a container in which a disinfectant solution is stored;
   a hand-held applicator having a volume for receiving a teat and comprising one or more scrubbing elements and the volume is in fluid communication with the container;
   a motor operatively connected to the scrubbing elements;
   a pump and a conduit in fluid communication with the hand-held applicator and the container; and
   a switch on the hand-held applicator in electrical communication with the control circuit;
   a power source in electrical communication with the control circuit;
   wherein the control circuit is in electrical communication with the motor to deliver disinfectant solution to the hand-held applicator to clean a teat when it is inserted into the volume of the hand-held applicator as the scrubbing elements are actuated;
   wherein the control circuit is configured such that when the switch is closed one or more signals are sent from the control circuit to activate the pump and the motor so that the disinfectant solution is delivered to the hand held applicator for a first time duration as the scrubbing elements are actuated during a cleaning cycle; and
   wherein the control circuit is further configured such that after the first time duration the pump is deactivated and the motor remains activated so that the scrubbing elements are actuated for a second time duration without delivery of disinfectant solution to the hand-held applicator during a drying cycle.

8. A mobile system for cleaning a teat of a milk-producing animal prior to a milking operation, comprising:
- a cart configured for movement across a floor of a building in which animals are housed;
- a control circuit on the cart;
- a motor on the cart in electrical communication with the control circuit;
- a container on the cart and in which a disinfectant solution is stored;
- a hand-held applicator, said applicator having a volume for receiving a teat and is in fluid communication with the container, and comprising one or more scrubbing elements, wherein the scrubbing elements are in mechanical drive communication with the motor;
- a pump on the cart and in fluid communication with the container and the hand-held applicator and in electrical communication with the control circuit;
- a power source on the cart in electrical communication with the control circuit;
- a switch on the hand-held applicator that is in electrical communication with the control circuit;
- wherein the control circuit is configured such that when the switch is actuated one or more signals are sent from the control circuit to activate the pump and the motor so that the disinfectant solution is delivered to the hand held applicator for a first time duration as the scrubbing elements are actuated during a cleaning cycle and,
- wherein the control circuit is further configured such that after the first time duration the pump is deactivated and the motor remains activated so that the scrubbing elements are actuated for a second time duration without delivery of disinfectant solution to the hand-held applicator during a drying cycle.

9. The mobile system of claim 8, further comprising a power source charging unit on the cart.

10. The mobile system of claim 8, wherein the cart includes a horizontally disposed platform and the container and power source are on platform.

11. The mobile system of claim 10, wherein the pump is on the platform.

12. The mobile system of claim 10, wherein the motor is on the platform.

13. The mobile system of claim 10, wherein the cart includes a plurality of panels connected to the platform and operatively connected to one another to form a housing within which the power source is positioned.

14. The mobile system of claim 13, wherein the container is disposed within the housing.

15. The mobile system of claim 13, wherein the control circuit is disposed within a control box that is in the housing.

* * * * *